April 5, 1938. D. B. BAKER ET AL 2,112,876
FUEL TANK MOUNTING FOR TRACTORS
Filed Feb. 24, 1936 2 Sheets-Sheet 1
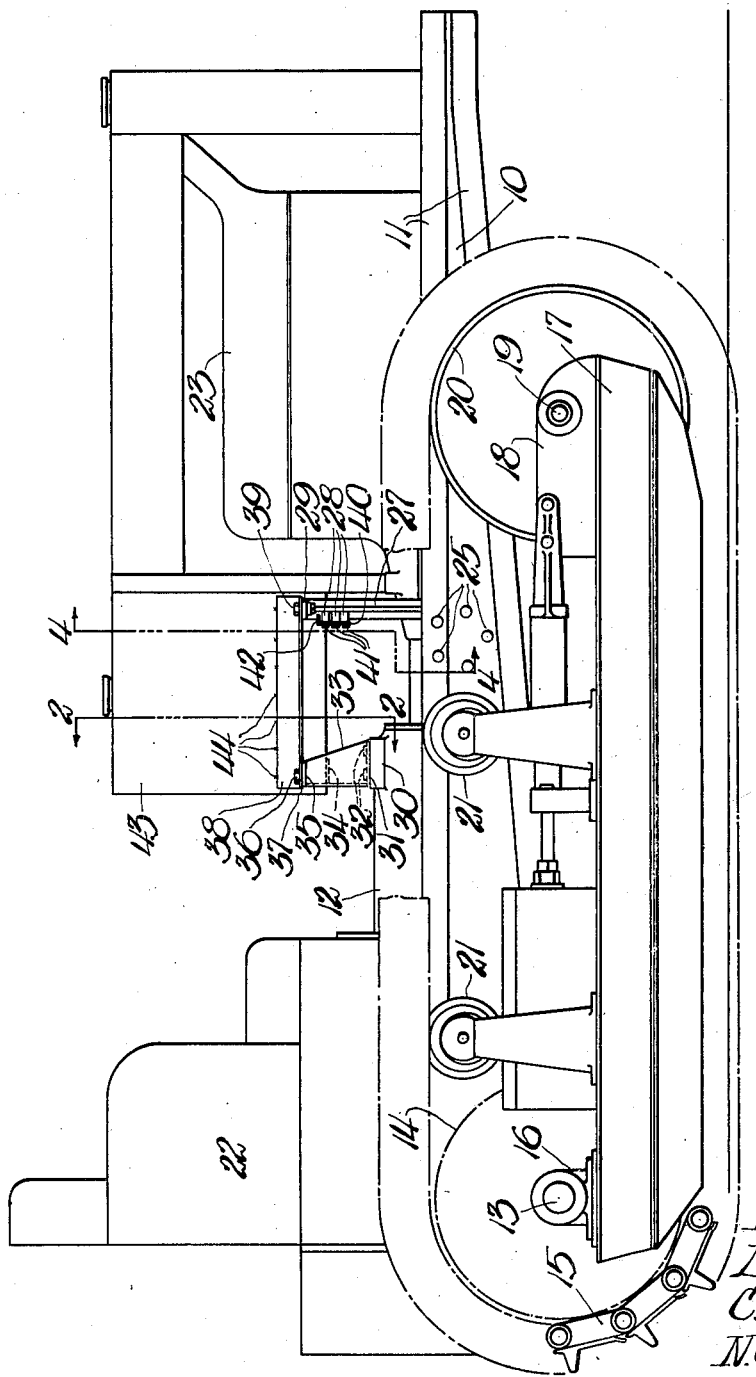
Inventors
D.B. Baker
C.R. Rogers
N.O. Panzegrau
By V.T. Lanague,
Atty.

April 5, 1938.  D. B. BAKER ET AL  2,112,876
FUEL TANK MOUNTING FOR TRACTORS
Filed Feb. 24, 1936  2 Sheets-Sheet 2
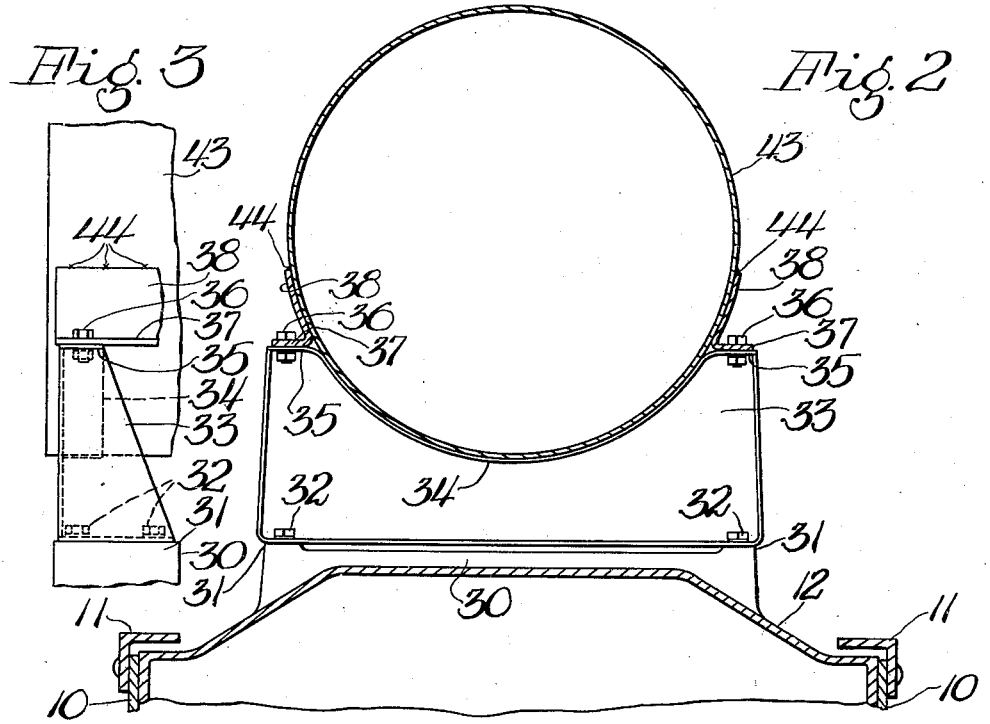
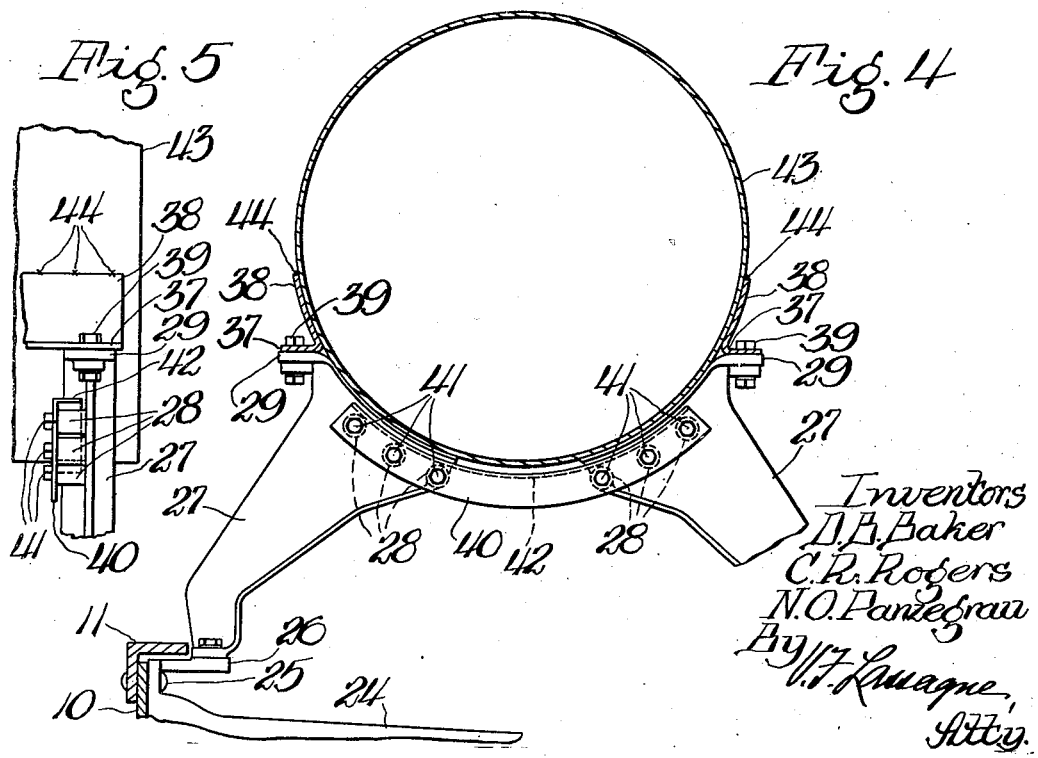
Inventors
D. B. Baker
C. R. Rogers
N. O. Pantzegrau Patented Apr. 5, 1938

2,112,876

UNITED STATES PATENT OFFICE 2,112,876

FUEL TANK MOUNTING FOR TRACTORS

David B. Baker, Riverside, Clifford R. Rogers, Oak Park, and Norman O. Panzegrau, Chicago, Ill., assignors to International Harvester Company, a corporation of New Jersey Application February 24, 1936, Serial No. 65,382

8 Claims. (Cl. 280—5)

The invention relates to tractors, and more particularly to the provision of an improved fuel tank mounting for carrying the fuel tank on the body of the tractor.

In the present embodiment of the invention there will be disclosed a crawler type tractor in which the main frame, supported on crawler units, is constructed of reenforced side plates which lie in vertical planes and run longitudinally in spaced, parallel relation, said frame plates at their rear ends being cross-connected by a transmission mechanism housing box, and which side frame plates at their forward ends carry a cross-connecter for mounting a motor.

The improved fuel tank mounting is provided to locate the fuel tank at the rear end of the motor.

It is common practice to mount fuel tanks rearwardly of the motor and on the body structure of the tractor with the tank usually transversely disposed across the body and elevated thereabove. Since the operator's seat and his driving control compartment are usually located just behind the tank, it follows that the projected ends of the tank cause an obstruction in the line of vision of the operator, so that it is difficult for him to see past the sides of the motor and across the front ends of the crawler track devices to aid him in maneuvering the tractor.

By means of the present invention the fuel tank is preferably cylindrical and has its longitudinal axis longitudinally disposed on the tractor, so that the fuel tank will not occupy much space transversely across the body of the tractor in front of the driver's seat, whereby the driver has better vision alongside the superstructure parts of the body, to facilitate his control and operation of the tractor.

This mounting of the fuel tank in heavy duty type tractors is a real problem since the fuel tank must be of relatively large capacity. For example, in the present disclosure the tractor is of such a size that it is desirable that the tank have a capacity of, at least, 75 gallons. This calls for a tank of considerable size, and, when loaded with fuel, requires stable support to carry all of this weight.

The main object of the invention is to provide an improved fuel tank mounting for tractors.

Another object is to provide such a mounting which will be capable of supporting a fuel tank of relatively large size in a rigid and stable manner on the body of a tractor, and in a position longitudinally thereon, so as not to interfere with the line of vision of the driver.

Another object is generally to simplify the structure for supporting a fuel tank.

These objects are achieved by the particular form of tank mounting disclosed in the accompanying sheets of drawings, wherein:

Figure 1 is a general side elevational view of a crawler type tractor with the improved fuel tank mounting carried on its body;

Figure 2 is an enlarged, transverse, rear sectional view through the tank, its mounting and the tractor body taken along the line 2—2 of Figure 1, looking in the direction of the arrows;

Figure 3 is an enlarged, detail, side elevational view to show one of the rear brackets for carrying the rear end of the tank;

Figure 4 is a view similar to Figure 2, but taken along the line 4—4 of Figure 1, looking in the opposite direction, as indicated by the arrow; and, Figure 5 is a side, elevational, detail view illustrating one of the forward bracket supports for the tank.

The main frame of the tractor comprises a pair of sheet metal side plates 10 lying in vertical planes and spaced apart to run longitudinally, with the respective upper and lower edges of the plates 10 carrying inturned upper and lower angle bars 11 for strengthening the side plates 10. The lower edge of each side plate 10 is tapered, so that the widest portion of each side plate 10 in a vertical direction will be disposed at the rear ends of each plate 10. These wide ends of each rear plate 10 are appropriately riveted or secured by bolts to a relatively large rear transmission box 12. Thus it is that the box 12 serves as a cross-connecter between the rear ends of the side frame plates 10.

This box 12 in any suitable manner carries a transverse rear axle 13, the ends of which project laterally from the side of the box to serve as journals for mounting the usual rear driving sprocket wheels 14, around which are respectively trained the opposite side endless track shoe crawler belts 15. The ends of the axle 13 further carry appropriate pivot brackets 16 for pivotally mounting the usual forwardly extending track frames 17, which extend longitudinally forwardly within the belts 15 and alongside the body 10 of the tractor. The forward end of each track frame 17 carries a jounal block 18 including a shaft 19 for turnably mounting a front idler wheel 20, said idler wheels guiding the forward loop of the respective chains 15 in the well known manner. The track frames 17 may carry additional idler wheels 21 for supporting the upper stretch of the track, if desired.

At the rear end of the box part 12 of the tractor body is mounted a seat 22 for the driver, and the forward end of the frame or body structure 10 carries in any suitable way a motor 23. Adjacent the rear end of the motor there is provided a cross-bolster 24 connected by rivets 25 at its ends to the respective side plates 10, said cross bolster including pads 26 at each end thereof for the mounting of a pair of upwardly and inwardly extending brackets 27, of which there are two respectively disposed one on each side of the tractor body. These brackets are very sturdy and include web portions, each carrying an arcuate series of integrally formed bosses 28 extending longitudinally from the rearward faces of the brackets, the upper edges of each bracket being formed arcuately in the surface of a common cylinder. Further, the upper end of each bracket includes a flange 29, which is turned outwardly, as shown in Figure 4.

The top of the box 12 at its forward edge is formed with a bracket portion 30 providing pads 31, to which is secured by means of bolts 32 a cross sheet metal wall member 33, which integrally includes a saddle portion 34 at its upper edge, which provides an arcuate cylindrical surface, as shown in Figure 2. The ends of the saddle flange 34 provide outturned flanges 35, to which are respectively secured by bolts 36 longitudinally running angle bars 37.

The horizontal flanges of the bars 37 are thus bolted respectively to the horizontal flanges 35. The other flange of the angle bars 37 is extended upwardly as a continuation of the cylindrical flange 34, as shown at 38. The forward ends of these angle bars 37 are secured by bolts 39 to the flanges 29 on the brackets 27 heretofore described.

An arcuate angle bar 40 has one flange disposed vertically and provided with holes at its ends, which respectively overlie the webs on the brackets 27, so that by means of bolts 41 the brackets 27 are tied together by the bar 40 in a transverse direction. The bolts 41 pass through the respective bosses 28, said bosses serving as spacers between the brackets 27 and bar 40. Further, this bar 40 has a horizontal flange 42 to strengthen the same, the bar 40 being generally curved in the same cylinder as the upper arcuate edges of the brackets 27.

A cylindrical fuel tank is shown at 43, the same being of relatively large size and having its axis longitudinally disposed, so that, when mounting the same, it can be laid down on the cylinder surfaces formed by the upper edges of the brackets 27 and the saddle flange 34 on the rear wall member 33, these upper saddle surfaces on the respective brackets 27 and wall 33 being complementary and common to the cylindrical surface of the tank 43 to make a good fit. When the tank 43 is thus mounted in place, the side edges of said tank are welded, as at 44, to the upper edge of the arcuate flange 38 of the side angle bars 37. It will thus be seen that the tank is securely mounted in place with the same longitudinally disposed and that, by means of the welding, the usual straps provided to hold down a fuel tank are eliminated.

It will further be appreciated from this disclosure that the improved fuel tank mounting is ample to support a tank of large capacity and of great weight in a sturdy manner and without the use of cumbersome and expensive securing devices.

It is the intention to cover all such changes and modifications of the illustrative example of the fuel tank mounting herein shown which do not in material respects constitute departures from the invention.

What is claimed is:

1. The combination with a tractor having a frame and a motor longitudinally mounted at the forward end thereof, of a fuel tank mounting on the frame behind the motor comprising a cross-support included in the frame at the rear end of the motor, a bracket structure mounted on the cross-support with the upper end thereof providing an arcuate surface of a cylinder, a vertical wall carried on the frame rearwardly of the cross-support and providing an upper saddle flange formed as the surface of the same cylinder, side bars longitudinally carried in spaced relation on the bracket structure and wall, said side bars being angular in cross section and presenting a horizontal flange secured to the bracket structure and wall and an upright arcuate flange conforming to the shape of the same cylinder, a cylindrical fuel tank carried longitudinally on said bracket structure and wall between the bars, and means for securing the tank to the upright arcuate flanges of said bars.

2. The combination with a tractor having a frame and a motor longitudinally mounted at the forward end thereof, of a fuel tank mounting on the frame behind the motor comprising a cross-support included in the frame at the rear end of the motor, a bracket structure mounted on the cross-support, a vertical wall carried on the frame rearwardly of the cross-support, side angle bars longitudinally carried in spaced relation on the bracket structure and wall, a fuel tank carried on said brackets and wall between the angle bars, said angle bars each comprising a horizontal flange secured to the bracket structure and wall and an upright flange adapted to fit respectively the opposite sides of the tank, said tank and upright flanges being welded together to secure the tank in place on said tank mounting structure.

3. The combination with a tractor having a frame comprising a pair of side members longitudinally disposed in spaced relation with a transmission box cross-connecting the rear ends thereof and with a motor longitudinally mounted at the forward end of the members, of a fuel tank mounting behind the motor comprising a cross-bolster connected between the members at the rear end of the motor and forwardly of the box, a bracket structure carried on the bolster, pads formed on the transmission box, a vertical wall carried on said pads, side bars longitudinally carried in spaced relation on the bracket structure and wall, a fuel tank carried longitudinally on said brackets and wall between the bars, and means for securing the tank to said bars.

4. The combination with a tractor having a frame comprising a pair of side members longitudinally disposed in spaced relation with a transmission box cross-connecting the rear ends thereof and with a motor longitudinally mounted at the forward end of the members, of a fuel tank mounting behind the motor comprising a cross-bolster connected between the members at the rear end of the motor and forwardly of the box, a bracket structure carried on the bolster, said bracket structure providing an arcuate surface of a cylinder, pads formed on the transmission box, a vertical wall carried on said pads and providing an upper saddle flange formed as the surface of the same cylinder, side angle bars longitudinally carried in spaced relation on the bracket structure and wall, said bars having respectively an upright arcuate flange lying on the surface of the same cylinder, a cylindrical fuel tank carried longitudinally on said brackets and wall between and nesting against the arcuate flange of the bars, and means for securing the tank to said arcuate flanges of the side angle bars.

5. The combination with a tractor having a frame comprising a pair of side members longitudinally disposed in spaced relation with a transmission box cross-connecting the rear ends thereof and with a motor longitudinally mounted at the forward end of the members, of a fuel tank mounting behind the motor comprising a cross-bolster connected between the members at the rear end of the motor and forwardly of the box, said bolster including a pad at each end thereof, a bracket secured to each pad, the upper ends of the brackets providing an arcuate surface of a cylinder, pads also formed on the transmission box, a vertical wall carried on said last mentioned pads and providing an upper saddle flange formed as the surface of the same cylinder, side angle bars longitudinally carried in spaced relation on the brackets and wall, a cylindrical fuel tank carried longitudinally on said brackets and wall between the angle bars, and means for securing the tank to said angle bars.

6. A fuel tank mounting for tractors comprising a pair of front brackets spaced transversely and each including a horizontal outwardly extending flange, a bar cross-connecting said brackets, a rear wall bracket structure also having oppositely extending outwardly turned horizontal flanges respectively in longitudinal alignment with the flanges on the front brackets, longitudinally extending side angle bars secured along each side of the front and rear bracket structures to their outwardly extending flanges, each side bar having an upright flange, and a fuel tank carried between said side bars on the front and rear bracket structures, the opposite sides of said tank being secured directly to the upright flanges of said side bars.

7. A fuel tank mounting for a tractor having a body on which a tank is disposed longitudinally comprising a pair of front brackets spaced transversely and each including an outwardly extending horizontal flange and an inwardly extending arcuate flange, a rear wall bracket structure also having oppositely extending outwardly turned horizontal flanges respectively in longitudinal alignment with the aforesaid horizontal flanges on the front brackets and an arcuate flange between said last named horizontal flanges, all of said arcuate flanges being formed as the surfaces of a common cylinder, a cylindrical fuel tank supported at the front and rear thereof on said arcuate flanges, and a pair of side angle bars at opposite sides of the fuel tank, each having an upwardly extending arcuate portion secured directly to the tank and an outwardly extending horizontal portion secured to the aforesaid horizontal flanges on the front brackets and the rear wall bracket structure.

8. A fuel tank mounting for a tractor having a body on which a tank is disposed longitudinally comprising a pair of front brackets spaced transversely and each including an outwardly extending horizontal flange and a contiguous inwardly and downwardly extending flange, a rear wall bracket structure also having oppositely extending outwardly turned horizontal flanges and contiguous inwardly and downwardly extending flanges respectively in alignment with corresponding flanges on the front brackets, a fuel tank supported at the front and rear thereof on said inwardly and downwardly extending flanges, and a pair of side angle bars at opposite sides of the fuel tank, each having a vertical leg secured directly to the fuel tank and a horizontal leg secured to the aforesaid horizontal flanges on the front brackets and rear wall bracket structure.

DAVID B. BAKER.
CLIFFORD R. ROGERS.
NORMAN O. PANZEGRAU.